US012367269B2

(12) United States Patent
Wokaty, Jr.

(10) Patent No.: US 12,367,269 B2
(45) Date of Patent: Jul. 22, 2025

(54) BIOMETRIC AUTHENTICATION-BASED TOKEN

(71) Applicant: Capital One Services, LLC, McLean, VA (US)

(72) Inventor: Robert Dwane Wokaty, Jr., Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 315 days.

(21) Appl. No.: 17/932,133

(22) Filed: Sep. 14, 2022

(65) Prior Publication Data
US 2024/0086507 A1     Mar. 14, 2024

(51) Int. Cl.
*G06F 21/32* (2013.01)
*G06F 21/33* (2013.01)
*G06V 40/12* (2022.01)
*G06V 40/13* (2022.01)

(52) U.S. Cl.
CPC ............ *G06F 21/32* (2013.01); *G06F 21/33* (2013.01); *G06V 40/13* (2022.01)

(58) Field of Classification Search
CPC ......... G06F 21/32; G06F 21/33; G06V 40/13; G06V 40/1365
See application file for complete search history.

(56) References Cited

U.S. PATENT DOCUMENTS

| | | | | |
|---|---|---|---|---|
| 2001/0017584 A1* | 8/2001 | Shinzaki | ............ | G06F 21/6245 340/5.6 |
| 2002/0089410 A1* | 7/2002 | Janiak | ............ | G07C 9/257 340/5.83 |
| 2002/0147924 A1* | 10/2002 | Flyntz | ............ | G06F 21/34 726/4 |
| 2003/0005310 A1* | 1/2003 | Shinzaki | ............ | G06Q 20/40145 713/186 |
| 2004/0030660 A1* | 2/2004 | Shatford | ............ | G07C 9/257 705/67 |
| 2004/0034784 A1* | 2/2004 | Fedronic | ............ | G06Q 20/341 713/186 |
| 2004/0230488 A1* | 11/2004 | Beenau | ............ | G06Q 20/3821 705/18 |
| 2006/0226951 A1* | 10/2006 | Aull | ............ | G06Q 20/40145 340/5.61 |

(Continued)

*Primary Examiner* — Darren B Schwartz
(74) *Attorney, Agent, or Firm* — Harrity & Harrity, LLP

(57) ABSTRACT

In some implementations, a physical medium may include a fingerprint scanner, one or more memories that store fingerprint data and a PIN, and one or more processors. The physical medium may receive power from a terminal that is in communication with the physical medium. The physical medium may scan a fingerprint using the fingerprint scanner and the power received from the terminal. The physical medium may compare scanned fingerprint data, determined based on scanning the fingerprint, and the stored fingerprint data using the power received from the terminal. The physical medium may determine that the scanned fingerprint data sufficiently matches the stored fingerprint data based on comparing the scanned fingerprint data and the stored fingerprint data. The physical medium may transmit the PIN to the terminal based on determining that the scanned fingerprint data sufficiently matches the stored fingerprint data.

20 Claims, 8 Drawing Sheets

(56) References Cited

U.S. PATENT DOCUMENTS

| | | | |
|---|---|---|---|
| 2007/0214093 A1* | 9/2007 | Colella | G07C 9/257 705/67 |
| 2007/0234066 A1* | 10/2007 | Dufour | G06F 21/32 713/186 |
| 2008/0028230 A1* | 1/2008 | Shatford | H04L 9/3231 713/186 |
| 2009/0191846 A1* | 7/2009 | Shi | H04L 63/0861 455/411 |
| 2010/0250957 A1* | 9/2010 | Cuppett | G06F 21/41 713/186 |
| 2012/0074232 A1* | 3/2012 | Spodak | G06Q 20/3574 235/492 |
| 2012/0079273 A1* | 3/2012 | Bacchiaz | H04L 9/40 713/168 |
| 2012/0204245 A1* | 8/2012 | Ting | H04L 9/3228 726/8 |
| 2013/0200999 A1* | 8/2013 | Spodak | G16H 10/65 340/5.65 |
| 2013/0332353 A1* | 12/2013 | Aidasani | G06K 19/07749 705/41 |
| 2014/0162598 A1* | 6/2014 | Villa-Real | G07F 7/0886 455/411 |
| 2015/0046257 A1* | 2/2015 | Tabor | G06Q 30/0253 705/14.51 |
| 2015/0333910 A1* | 11/2015 | Kirdahy | G06F 21/34 713/186 |
| 2015/0373019 A1* | 12/2015 | El Saddik | A61B 5/349 340/5.52 |
| 2016/0021107 A1* | 1/2016 | Lazzaro | H04L 63/0861 235/492 |
| 2016/0217312 A1* | 7/2016 | Gardiner | H04L 63/0861 |
| 2016/0267262 A1* | 9/2016 | Taniguchi | G06F 21/32 |
| 2017/0147800 A1* | 5/2017 | Huang | G06V 40/13 |
| 2017/0149840 A1* | 5/2017 | Zhang | G06Q 20/108 |
| 2017/0286748 A1* | 10/2017 | Kim | G06V 40/1382 |
| 2017/0351896 A1* | 12/2017 | Jiang | G06F 21/32 |
| 2018/0012057 A1* | 1/2018 | Cho | G06F 3/04883 |
| 2018/0247042 A1* | 8/2018 | Schuster | G06F 21/34 |
| 2018/0276519 A1* | 9/2018 | Benkley, III | G06F 21/45 |
| 2019/0095655 A1* | 3/2019 | Krawczewicz | H04L 9/3249 |
| 2020/0026975 A1* | 1/2020 | Climen | G06F 21/45 |
| 2021/0256241 A1* | 8/2021 | Baker | G06F 1/32 |
| 2021/0409536 A1* | 12/2021 | Xu | G06F 3/0486 |
| 2022/0350873 A1* | 11/2022 | Kato | G06F 21/45 |
| 2023/0146678 A1* | 5/2023 | Barnum | G06V 40/13 726/17 |

* cited by examiner

BIOMETRIC AUTHENTICATION-BASED TOKEN

BACKGROUND

Biometric authentication is an identification and/or security process that uses a biologically unique identifier (e.g., fingerprint, voice, iris, retina, or face) of an authorized user (e.g., an account owner, a device owner, or the like) to authenticate a user trying to gain access to physical and/or digital resources (e.g., an account or a device). The process includes scanning a biologically unique identifier of the user trying to gain access and comparing the scan to a stored copy of the biologically unique identifier of the authorized user. If there is a sufficient match, then the user is granted access to the physical and/or digital resources.

SUMMARY

Some implementations described herein relate to a system for a biometric authentication-based token. The system may include a physical medium that may include a fingerprint scanner, a processor, and memory that may store fingerprint data, an account identifier, and an authentication credential for use with authenticating an interaction. The processor may be configured to scan a fingerprint using the fingerprint scanner. The processor may be configured to compare scanned fingerprint data, determined based on scanning the fingerprint, and the stored fingerprint data using the power received from the terminal. The processor may be configured to determine that the scanned fingerprint data sufficiently matches the stored fingerprint data based on comparing the scanned fingerprint data and the stored fingerprint data. The processor may be configured to transmit, to the terminal, the authentication credential and the account identifier based on determining that the scanned fingerprint data sufficiently matches the stored fingerprint data. The system may include one or more memories, and one or more processors, communicatively coupled to the one or more memories. The one or more processors may be configured to receive the account identifier and the authentication credential from the terminal. The one or more processors may be configured to verify that the authentication credential is valid for the account identifier. The one or more processors may be configured to transmit an approve notification to the terminal based on verifying that the authentication credential is valid for the account identifier.

Some implementations described herein relate to a physical medium for a biometric authentication-based token. The physical medium may include a fingerprint scanner, one or more memories that store fingerprint data and a personal identification number (PIN), and one or more processors communicatively coupled to the one or more memories. The one or more processors may be configured to receive power from a terminal that is in communication with the physical medium. The one or more processors may be configured to scan a fingerprint using the fingerprint scanner and the power received from the terminal. The one or more processors may be configured to compare scanned fingerprint data, determined based on scanning the fingerprint, and the stored fingerprint data using the power received from the terminal. The one or more processors may be configured to determine that the scanned fingerprint data sufficiently matches the stored fingerprint data based on comparing the scanned fingerprint data and the stored fingerprint data. The one or more processors may be configured to transmit the PIN to the terminal based on determining that the scanned fingerprint data sufficiently matches the stored fingerprint data. The physical medium may include a housing in which the fingerprint scanner, the one or more memories, and the one or more processors are housed.

Some implementations described herein relate to a method of authentication. The method may include receiving, by a key fob having one or more processors, power from a terminal that is in communication with the key fob for performing an interaction. The method may include scanning, by a fingerprint scanner of the key fob, a fingerprint associated with a user. The method may include comparing, by the one or more processors of the key fob, scanned fingerprint data, determined based on scanning the fingerprint, and stored fingerprint data, stored on one or more memories of the key fob, using the power received from the terminal. The method may include determining, by the one or more processors of the key fob, that the scanned fingerprint data sufficiently matches the stored fingerprint data based on comparing the scanned fingerprint data and the stored fingerprint data. The method may include transmitting, by the key fob and to the terminal, an authentication credential and an account identifier associated with a user account of the user based on determining that the scanned fingerprint data sufficiently matches the stored fingerprint data.

DETAILED DESCRIPTION

Figure 1A:
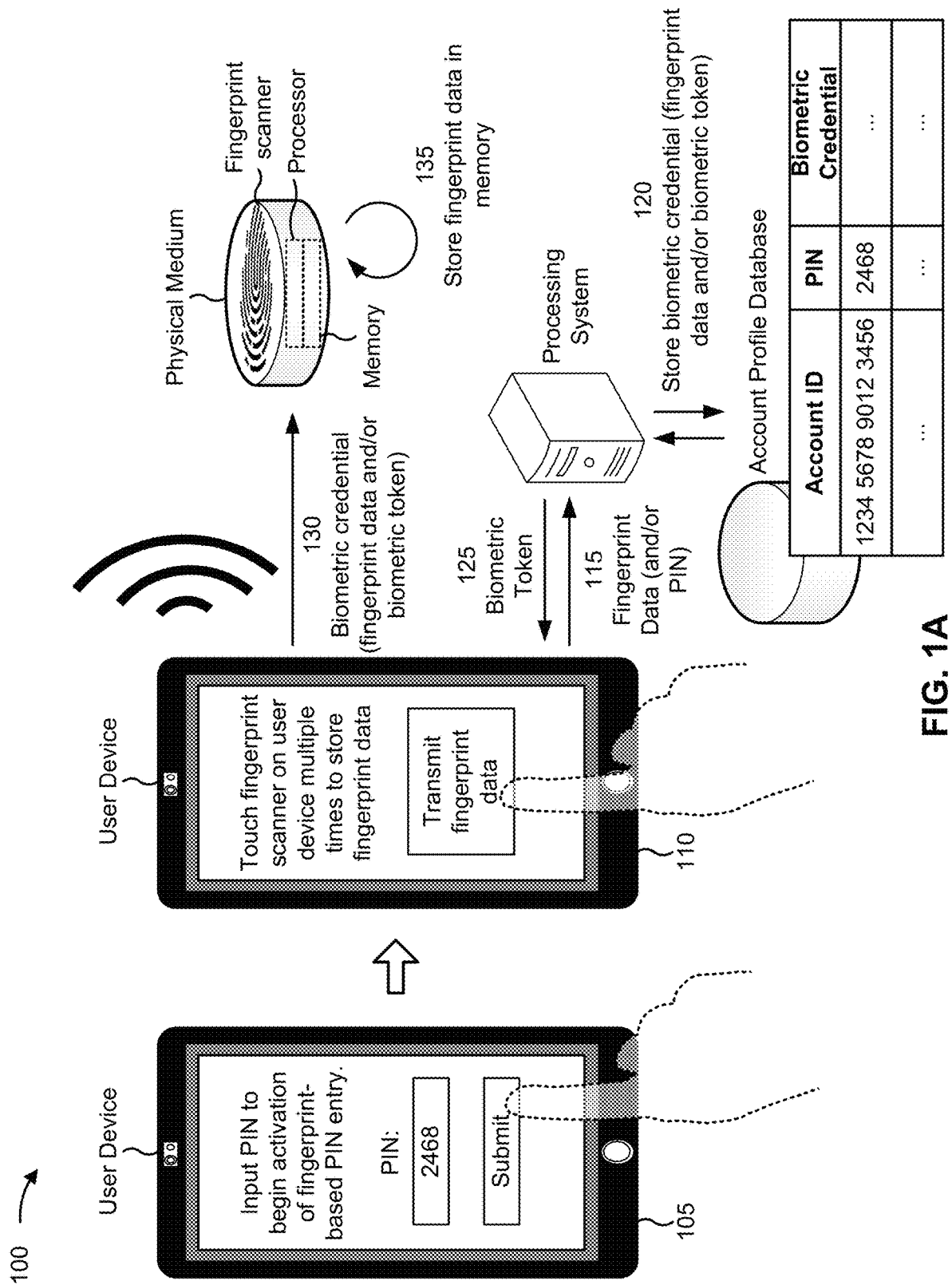
FIGS. 1A-1C are diagrams of an example associated with a biometric authentication-based token, in accordance with some embodiments of the present disclosure.

The following detailed description of example implementations refers to the accompanying drawings. The same reference numbers in different drawings may identify the same or similar elements.

Modern transaction cards (e.g., automated teller machine (ATM) cards, debit cards, credit cards, or gift cards) contain embedded integrated circuits to store authentication data that is provided to an authenticating device or terminal (e.g., a point-of-sale (PoS) terminal or an ATM) at the time of a transaction. For some transaction cards, the authentication data may be a fingerprint of a cardholder stored on the transaction cards, which may provide more security than, for example, a personal identification number (PIN). The transaction cards may employ fingerprint scanners that require a user to provide a fingerprint at the time of the transaction. In one example of such a transaction card, a digital template of the cardholder's fingerprint is stored in memory of the transaction card. When a user presents the transaction card at the terminal, the transaction card, via the fingerprint scanner embedded on the transaction card, scans the user's fingerprint and matches it to the digital template of the cardholder's fingerprint stored in the memory of the transaction card. If there is a successful match, the transaction is authenticated. No authentication data is transmitted from the transaction card to the terminal.

However, such transaction cards that utilize fingerprint authentication still may be exploited (e.g., by lifting a fingerprint pattern from a fingerprint reader that has not been wiped clean). Because the authentication data (e.g., fingerprints) are maintained solely on the transaction cards, there are no additional layers of security beyond the transaction cards themselves (e.g., if the fingerprint pattern is lifted and/or replicated). Furthermore, given the small footprint of the transaction cards, the amount of storage space on which to store the fingerprints is limited. Thus, the transaction cards offer limited to no flexibility for the account holder as to who may be authorized to use the transaction card.

Some implementations described herein relate to a system for fingerprint-based authentication (e.g., an authentication system) that includes a physical medium (e.g., a token, such as a key fob) and a processing system. The physical medium may store fingerprint data corresponding to one or more fingerprints (e.g., thumbprints) of respective authorized users (e.g., the account holder and/or users authorized by the account holder), a biometric credential (e.g., unique identifier generated from the fingerprint data corresponding to the user and the account) for each fingerprint, and/or a PIN corresponding to the account. During a transaction at a terminal (e.g., an ATM, a PoS terminal, a kiosk machine, or a ticketing machine), the physical medium, via a fingerprint scanner on or in the physical medium, scans a fingerprint of the user. If the corresponding scanned fingerprint data substantially matches the stored fingerprint data, then the physical medium may transmit an authentication credential (e.g., the biometric credential and/or the PIN) to the terminal. The processing system in turn may receive the authentication credential from the terminal. The processing system then may determine whether or not there are any conditions, as stored by the processing system, that are met, which would prevent authorization of the transaction (e.g., the biometric credential received by the terminal does not match any biometric credentials stored by the processing system). Depending on this determination, the processing system may send a notification to the terminal approving or declining the transaction.

In some implementations described herein, an account holder and/or authorized user may be able to selectively enable and disable the fingerprint-based authentication feature on the physical medium (e.g., for a particular user or for all users). The processing system may track and/or store the enabled/disabled status of the physical medium. As such, when the processing system receives a request for approval from a terminal, the processing system may determine whether the feature is enabled or disabled. If the processing system determines that the feature is disabled, the processing system may decline the transaction. Thus, the authentication system provides protection against situations in which the physical medium has been stolen, and the account holder disables the fingerprint-based authentication feature as a result, even if the person who stole the physical medium is able to replicate/lift the account holder's fingerprint.

In some implementations described herein, the physical medium may be able to store and access fingerprint data and biometric credentials for multiple users (e.g., the account holder and any authorized users). Additionally, through the processing system, the account holder may be able to designate a primary user and secondary users. The account holder may be able to place restrictions on secondary users (e.g., limits on funds, set times and/or days that the secondary users may use the physical medium, and/or the like). Thus, the authentication system provides added security, even with multiple users on the account, through the use of the biometric credentials.

Figure 1B:
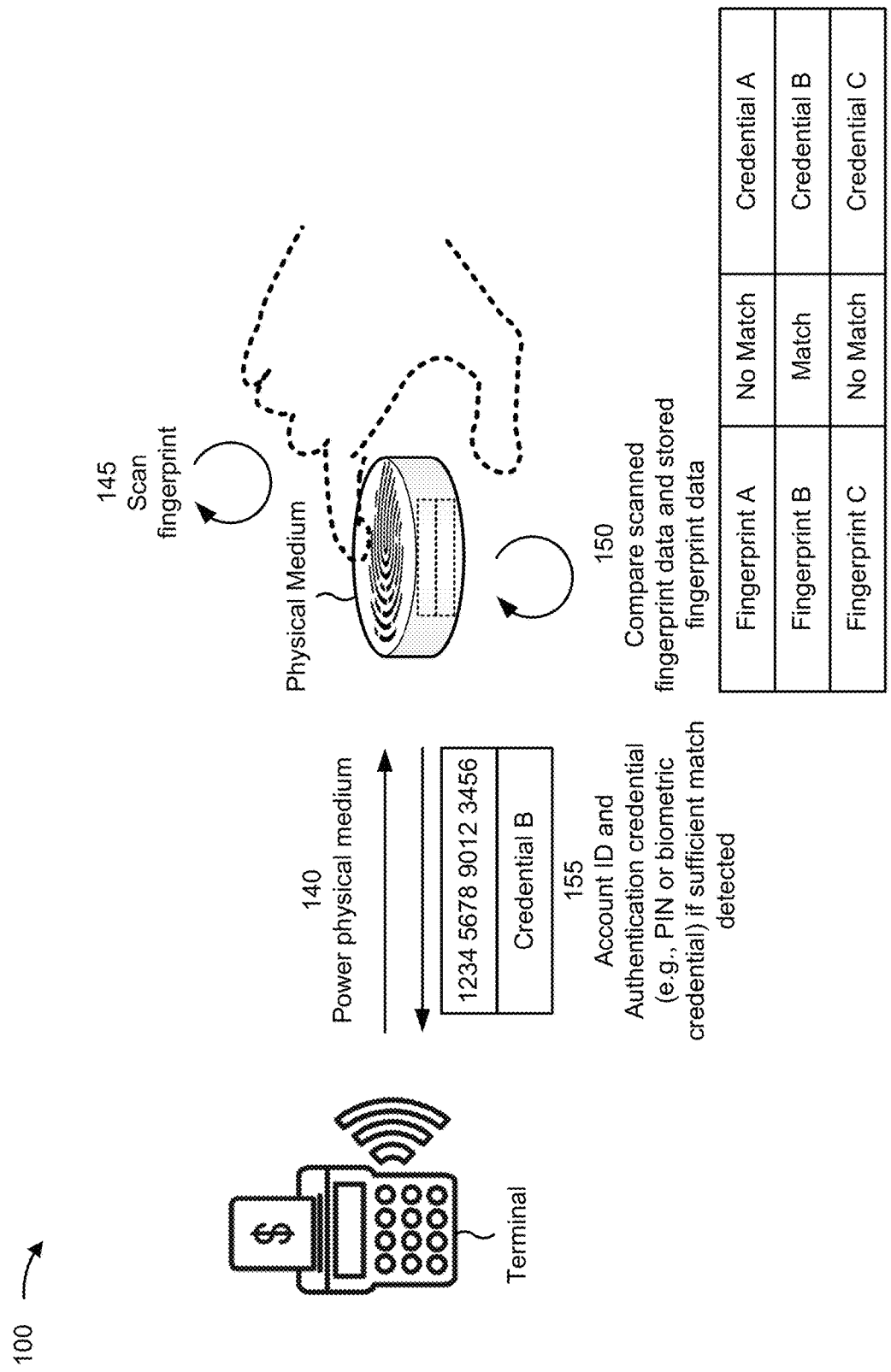
Figure 1C:
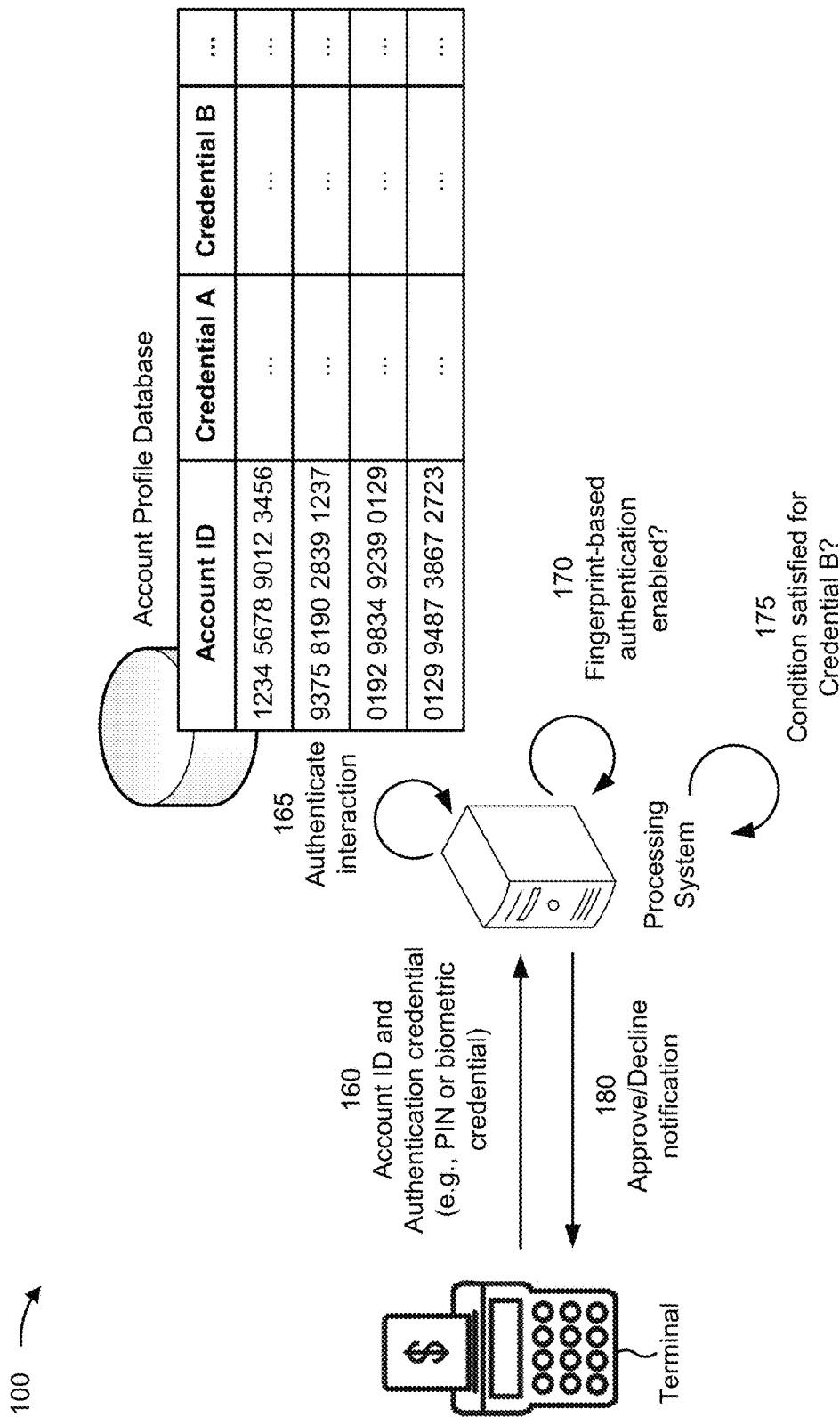

FIGS. 1A-1C are diagrams of an example 100 associated with a biometric authentication-based token. As shown in FIGS. 1A-1C, example 100 includes a processing system, an account profile database, a user device, a terminal, and a physical medium. These devices are described in more detail in connection with FIGS. 4 and 5.

As shown in FIG. 1A, a user (e.g., an authorized user of an account, or an account holder) may use a user device to set up and/or activate fingerprint-based credential entry (e.g., a biometric credential) for the account. The fingerprint-based credential entry may be used in relation to a physical medium, such as token (e.g., a key fob). The user device may include a fingerprint scanner. For example, the user device may be a mobile phone, as shown in FIG. 1A, a computer, an ATM, a fingerprint scanning machine (e.g., at a bank branch location), or the like that includes an optical scanner, a capacitance scanner, an ultrasonic scanner, or a thermal scanner. The fingerprint scanner may be a dedicated fingerprint scanner or may be incorporated in a touchscreen display of the device. A phone or computer may allow for the user to set up and/or activate the fingerprint-based credential entry at the user's convenience (e.g., time and location). Alternatively, an ATM and/or fingerprint scanning machine at a bank branch location may be convenient for the user to set up and/or activate the fingerprint-based credential at the same time as setting up an account and/or under the supervision and security of the bank.

The account may have an account identifier (e.g., an account ID number, a primary account number (PAN), or a virtual card number) and one or more authentication credentials (e.g., a PIN or biometric credential) associated with the account. The account identifier may be separately stored by the processing system and the physical medium. The account holder and/or an authorized user may gain access to and/or control of the account (e.g., use information and/or resources of the account, or change settings of the account) via the one or more authentication credentials. The one or more authentication credentials may be associated with each other and/or the account identifier by the processing system (e.g., in the account profile database). In some implementations, the account may multiple have sub-accounts. The sub-accounts may be the same or different account types (e.g., checking, savings, credit), and the sub-accounts may have distinct account identifiers. For example, the account may have a first sub-account (also referred to herein as a first account) that may be a credit account type, and a second sub-account (also referred to herein as a second account) that may be a checking or savings account type.

As shown by reference number 105, the user of the user device may input a PIN via the user device. For example, the user device may present to the user a designated entry field on a display of the user device in which the user may enter the PIN (e.g., via a physical keyboard, a virtual keyboard, or a voice entry). As further shown by reference number 105, the user may then submit the PIN (e.g., by pressing a submit button on a touchscreen of the user device or a physical submit or enter button, or by a voice command). In some implementations, the user may submit the PIN to be set up as an authentication credential for the account (e.g., in connection with fingerprint-based credential entry). Alternatively, in scenarios in which the PIN is already set up as an authentication credential for the account (e.g., for a physical medium used for the account that does not initially use fingerprint-based credential entry), the entered PIN may serve to authenticate the user and grant the user access to the account to set up and/or activate the fingerprint-based credential entry for the account. For example, the user device may have a PIN corresponding to the account stored internally on the user device (e.g., on a hard drive) or the PIN may be stored externally on a remote server or database (e.g., in a cloud computing environment and/or the processing system). The user device may obtain and compare the stored PIN with the entered PIN to determine if the two match each other (e.g., the stored PIN and the entered PIN are the same). Additionally, or alternatively, the user device may transmit the entered PIN to a remote server (e.g., over a network). The remote server then may compare the entered PIN with the stored PIN, and, if the two match each other, transmit approval to the user device to grant the user access to the account to proceed to set up and/or activate the fingerprint-based credential entry.

As shown by reference number 110, after the authorized user has submitted the PIN, the user device then may scan, via the fingerprint scanner of the user device, one or more fingerprints of the authorized user and/or any other users authorized by the authorized user. The term "fingerprint," as used herein is intended to broadly include a print of any digit, including any finger or thumb, and includes a "thumbprint." For example, the user device may instruct (e.g., present instructions in text on the display of the user device or via voice through a speaker of the user device) a particular user to place a finger on the fingerprint scanner. The user device may detect a user interaction with the fingerprint scanner (e.g., the user's finger pressing on the fingerprint scanner one or more times) until the user device determines that the scan of the fingerprint is complete (e.g., the scan satisfies a threshold amount of unique identifier information captured from the scan). The user device may provide a notification that the scan is complete. The scan may be in the form of data associated with the fingerprint (e.g., fingerprint data). For example, the scan may be a digital representation of the scanned fingerprint, such as multiple minutiae points (e.g., 17 to 35 minutiae points) that represent the major features of the fingerprint image. The user device may temporarily store the fingerprint data (e.g., in the user device's random access memory (RANI)) or permanently store the fingerprint data (e.g., on the user device's hard drive). As further shown by reference number 110, the user may select (e.g., by pressing a submit button on a touchscreen of the user device or a physical submit or enter button, or by a voice command) to transfer the fingerprint data.

As shown by reference number 115, the processing system may receive the fingerprint data and/or the PIN from the user device (e.g., over a network described in more detail below). As shown by reference number 120, the processing system may store (e.g., in an account profile database) the fingerprint data as a biometric credential for each scanned fingerprint and may associate the biometric credential with the account identifier(s) and/or the PIN. Additionally, or alternatively, the processing system may generate a biometric token from the fingerprint data for each scanned fingerprint. For example, the biometric token may be a unique identifier (e.g., a series of alphanumeric characters) for each fingerprint. The processing system may have access to all biometric tokens (e.g., stored in the account profile database), and may generate a biometric token that is globally unique (e.g., differs from all other biometric tokens stored in the account profile database). In this respect, the biometric token is distinct from the PIN because multiple users and/or accounts may have the same PIN, whereas each biometric token is unique to a user. Additionally, the biometric token may be smaller (e.g., require less storage space and/or memory) than the fingerprint data, which conserves memory resources. For example, the processing system may generate the biometric token by applying a hashing algorithm or another algorithm to the fingerprint data (e.g., the minutiae points), which may compress the fingerprint data. As shown by reference number 125, the processing system may transmit the biometric token to the user device, which may store the biometric token and/or transmit the biometric token to the physical medium, as described below.

As shown by reference number 130, the physical medium may receive the biometric credential (e.g., the fingerprint data and/or the biometric token) for one or more users from the user device, for example, over a wireless network (e.g., near field communication (NFC), radio frequency (RF), or the like). In some implementations, the physical medium may also receive the PIN from the user device (e.g., in connection with receiving the biometric credential), such as when the PIN is being set up or updated and/or when the PIN is used to authenticate a user and permit storage of the biometric credential. For example, in some implementations (e.g., when a PIN has already been set up), the physical medium may compare a PIN received from the user device to a PIN stored by the physical medium. If the PINs match, then the physical medium may store the fingerprint data and/or the biometric token. If the PINs do not match, then the physical medium may refrain from storing the fingerprint data and/or the biometric token. This provides additional security to prevent fingerprint data from being stored and/or overwritten by an unauthorized user. The physical medium may have a processor, a memory, a fingerprint scanner, and an embedded microchip via which the physical medium may receive and/or transmit data (e.g., the fingerprint data, the biometric token, and/or the PIN). As shown by reference number 135, the physical medium may store the fingerprint data, the biometric token, and/or the PIN (e.g., in the memory of the physical medium).

Because the processing system is separate and remote from the physical medium and separately stores one or more biometric credentials (e.g., the fingerprint data and/or biometric token), the processing system may provide a secondary check on the authority of a user attempting to gain access to the account, as described in more detail below. As such, the processing system serves as an extra layer of security beyond the requirement of only a fingerprint match via the physical medium.

In some implementations, the physical medium and/or the processing system (e.g., via the account profile) may be able to store the fingerprint data for more than one user. The memory and/or storage of the processing system (e.g., the account profile database) may have greater capacity than the memory of the physical medium. As such, the processing system may store and/or have access to biometric credentials (e.g., fingerprint data and/or biometric tokens) for more users than the physical medium for a particular account (e.g., the physical medium may store a subset of the total biometric credentials associated with the particular account). Thus, the account holder and/or an authorized user may be able to modify what subset of the biometric credentials is stored on the physical medium (e.g., choose which users are authorized to use the physical medium) at a particular time, thereby offering the account holder and/or the authorized user flexibility to control and/or monitor the use of the physical medium, as described in more detail below. Additionally, if the biometric credentials for a particular user is removed from the physical medium, the removed biometric credentials could be subsequently accessed by the processing system such that the set up and activation for the corresponding user would not have to be repeated, thereby conserving processing resources and time.

Although FIG. 1A shows the user device performing the initial scan of the fingerprint, as described above, in some implementations, the user may scan and store fingerprint data directly using the physical medium (in lieu of the physical medium receiving the fingerprint data from the user device) in an activation procedure that activates the fingerprint-based credential entry (e.g., a fingerprint-based PIN entry). The user device may provide instructions to the user to use the fingerprint scanner of the physical medium in a similar manner as for scanning the fingerprint via the user device. Then, the physical medium may transmit the fingerprint data (and/or the PIN) to the user device, which in turn may transfer the fingerprint data (and/or the PIN) to the processing system to be stored and/or to generate a biometric token for each scanned fingerprint, as described above.

As shown in FIG. 1B, the user may use the physical medium in connection with a terminal, such as a PoS terminal (e.g., at a restaurant, a store, or a retail location), an ATM, a kiosk machine, or a ticketing machine. The physical medium may interact with the terminal by being in close proximity to the terminal. As shown by reference number 140, the terminal may provide power to the physical medium by way of the interaction between the physical medium and the terminal. In some implementations, the physical card may have a radio frequency antenna that communicates with the terminal via NFC or radio frequency identification (RFID) to enable the physical medium to receive the power via electromagnetic induction. The power received from the terminal may activate the functionality of the physical medium (e.g., the fingerprint scanner).

As shown by reference number 145, the fingerprint scanner may scan a fingerprint of the user. For example, the fingerprint scanner may detect a user interaction with the fingerprint scanner (e.g., the user's finger pressing on the fingerprint scanner one or more times) until the physical medium determines that the scan of the fingerprint is complete (e.g., the scan satisfies a threshold amount of unique identifier information, or minutiae points, captured from the scan). The physical medium may provide a notification (e.g., a sound or a light) that the scan is complete, allowing the user to remove the user's finger from the fingerprint scanner. Alternatively, the user may be required to maintain the user's finger on the fingerprint scanner even after the scan has completed in order for the physical medium to function. The scan of the fingerprint may be in the form of data associated with the fingerprint (e.g., fingerprint data). For example, the scan may be a digital representation of the scanned fingerprint, such as multiple minutiae points (e.g., 17 to 35 minutiae points).

As shown by reference number 150, the physical medium, using the power received from the terminal, may compare the scanned fingerprint data and the stored fingerprint data (e.g., stored in the memory of the physical medium) and determine if there is a sufficient match between the scanned fingerprint data and the stored fingerprint data. For example, the physical medium may determine that the scanned fingerprint data sufficiently matches the stored fingerprint data if at least a threshold number of minutiae points match (e.g., at least 10 minutiae points). As shown by reference number 155, after the physical medium detects a sufficient match, the physical medium may transmit the account identifier (e.g., a PAN) and the authentication credential (e.g., the biometric credential and/or the PIN) to the terminal (e.g., via the NFC or RFID). In implementations in which the user has multiple sub-accounts, the user may be able to select which account identifier is transmitted (e.g., which sub-account to use in association with a particular interaction). The physical medium may have one or more account selection elements (e.g., a switch and/or buttons) that enable the user to select the particular sub-account. For example, the account selection element may be a switch having a position that is switchable between a first position and a second position. The first position may correspond to a first account (e.g., a credit account type) and the second position may correspond to a second account (e.g., a checking or savings account type). The account identifier transmitted may be based on the position of the switch.

As an example, as shown in FIG. 1B, the physical medium may have stored fingerprint data for multiple fingerprints (e.g., "Fingerprint A," "Fingerprint B," and "Fingerprint C") corresponding to different fingers (e.g., each corresponding to different fingers of a single user, each corresponding to a finger of a different user, or a combination thereof). Each fingerprint may have a corresponding biometric credential (e.g., "Credential A," "Credential B," and "Credential C"). The physical medium may compare the scanned fingerprint data with the stored fingerprint data for each fingerprint. After detecting a sufficient match of the scanned fingerprint data with the stored fingerprint data corresponding to one of the fingerprints (e.g., "Fingerprint B"), the physical medium may then transmit the corresponding biometric credential (e.g., "Credential B") and/or the PIN, along with the account identifier, to the terminal.

As shown in FIG. 1C, and by reference number 160, the processing system may receive the account identifier and the authentication credential (e.g., the biometric credential and/or the PIN) from the terminal. As shown by reference number 165, the processing system may authenticate the interaction (e.g., the transaction) between the physical medium and the terminal (e.g., verify that the received authentication credential is valid for the account identifier). For example, the processing system may search the account profile database for a stored account identifier that matches the received account identifier, and then compare the received PIN with the stored PIN associated with the account identifier. Additionally, or alternatively, the processing system may compare the received biometric credential (e.g., biometric token) with the stored biometric credential associated with the account identifier. If there is a match (e.g., the received authentication credential is identical to the stored authentication credential), then the processing system may approve the interaction. If there is not a match, then the processing system may decline the interaction.

In some implementations, the account profile may have multiple authentication credentials (e.g., PIN and/or biometric credential) corresponding to multiple users associated with the account identifier (e.g., the account holder and authorized users). One of the users may be designated as a primary user and the remaining users as secondary users. For example, the account holder may be able to select the primary user (e.g., the account holder) and/or the secondary users (e.g., all other users) via an application on the user device (e.g., an application stored on the user device or a web-based application accessed over a network on the user device). The processing system may receive the user designations from the user device (e.g., the application), and may store the designation with the particular user's biometric credential (e.g., in the account profile database). Additionally, or alternatively, the account holder (or the first person whose fingerprint was scanned during set up and activation) may be automatically designated as the primary user and all subsequent users as secondary users. The account holder may be able to modify the default designations (e.g., via the application on the user device). The primary user may have more account permissions (e.g., access to account information and/or ability to make changes to the account) than the secondary users.

In some implementations, there may be a setting associated with the account identifier that allows the fingerprint-based authentication to be enabled or disabled (e.g., the account holder and/or primary user may be able to selectively enable and disable the fingerprint-based authentication feature on the physical medium for a particular user or for all users). When the fingerprint-based authentication feature is disabled, the user for whom the fingerprint-based authentication is disabled will be unable to use the physical medium in an interaction with a terminal. As an example, the account holder and/or primary user may select and/or update an enabled/disabled status for each user via the application on the user device. The processing system may receive the status from the user device (e.g., the application). The processing system may maintain and/or update the enabled/disabled status (e.g., in the account profile database) for each user (e.g., the biometric credential associated with the particular user). The account holder and/or the primary user may actively select the enabled/disabled status (e.g., the status will stay on the selection until the status is actively changed). Additionally, or alternatively, the account holder and/or primary user may set specific parameters for the timing of the disabled status (e.g., schedule specific days and/or time of day that the user's status is set to disabled and/or the duration of the disabled status), which may be automatically maintained by the processing system. Alternatively, the account holder and/or primary user may be able to select the status to be disabled for all categories.

As shown by reference number 170, after the processing system has authenticated the interaction, the processing system may check the enabled/disabled status for the user corresponding to the biometric credential received in the interaction. The processing system may approve or decline the interaction based on the enabled/disabled status for the particular user (e.g., approve the interaction if the status is enabled or decline the interaction if the status is disabled).

As shown by reference number 175, in some implementations, there may be one or more user-specified conditions that need to be satisfied after the processing system has authenticated the interaction before approving or declining the interaction. The one or more conditions may be specific to the user, to the interaction, and/or to the type of authentication credential (e.g., biometric credential or PIN) being used for a particular interaction. For example, one condition may be that a valid user (e.g., a secondary user) is not authorized to perform interactions without approval from the primary user. Thus, when the processing system matches the received biometric credential with a stored biometric credential of a secondary user (e.g., based on the designation in the account profile database), the processing system may transmit a notification to a user device associated with the primary user requesting approval to authorize the secondary user and/or the secondary user's interaction with the terminal. If the processing system receives an approval indication from the user device (e.g., the primary user approves), then the processing system may approve the interaction. If the processing system receives a denial indication from the user device (e.g., the primary does not approve), then the processing system may decline the interaction. If the processing system does not receive any indication from the user device within a set amount of time (e.g., 1 minute), then the processing system may default to either approving or declining the interaction. The default may be set by the primary user (e.g., account holder) and stored by the processing system.

Additionally, or alternatively, the account holder may be able to selectively set other conditions (e.g., conditions relating to the interaction) restricting the use of the physical medium on secondary users (either specific to a particular secondary user or applied to all secondary users). For example, one condition may be a limit on funds (e.g., an amount of the interaction cannot exceed a maximum amount). As another example, another condition may be based on a third party identifier (e.g., a merchant identifier) associated with the interaction (e.g., the interaction cannot be with a third party, such as a merchant, on a restricted list, and/or can only be with a third party on an approved list). As another example, another condition may be based on a third party type (e.g., a merchant type or merchant category) associated with the interaction (e.g., the interaction can only be made in connection with an approved category, such as food, and/or not in a restricted category, such as video games). As another example, another condition may be based on a date and/or time associated with the interaction (e.g., the interaction can only occur on specific days, such as weekdays, and/or between a specific block of time, and/or the interaction cannot occur on specific days, such as weekends, and/or between a specific block of time).

The approval of the interaction may be based on whether one or more of these conditions are satisfied. For example, if one or more conditions are satisfied, the processing system may automatically approve the interaction. Similarly, if one or more conditions are not satisfied, the processing system may automatically decline the interaction. Alternatively, if one or more conditions are not satisfied, the processing system may transmit a notification to the primary user (e.g., to an application on the user device associated with the primary user) that an interaction is being attempted by a user and requesting an authorization input (e.g., whether the account holder approves or declines the attempted interaction). The notification may include such information as a user identifier (e.g., who is the secondary user attempting the interaction), the particular condition or conditions not being satisfied (e.g., the interaction amount is over the limit on funds), the particular interaction information not satisfying the condition (e.g., the actual interaction amount), and/or other interaction information (e.g. third party identifier). If the processing system receives an approval indication from the user device (e.g., the primary user approves), then the processing system may approve the interaction. If the processing system receives a denial indication from the user device (e.g., the primary does not approve), then the processing system may decline the interaction. If the processing system does not receive any indication from the user device within a set amount of time (e.g., 1 minute), then the processing system may default to declining the interaction.

Additionally, or alternatively, there may be one or more conditions related to the type of authentication credential (e.g., biometric credential or PIN) being used for the interaction. For example, the processing system may receive and match a biometric credential for a secondary user. However, the secondary user and/or the attempted interaction may fail to meet one or more conditions specific to the secondary user (e.g., the interaction amount is greater than the minimum threshold set for the secondary user) set by the primary user, and therefore, the processing system may decline the attempted interaction. In such a scenario, the processing system may temporarily store information related to the attempted interaction (e.g., interaction amount, third party identifier, or third party type) for some threshold amount of time (e.g., 5 or 10 minutes). If a new interaction is attempted within the time threshold via an authentication credential that would result in the interaction being allowed (e.g., the PIN or the biometric credential of another secondary user not restricted by similar conditions), then the processing system may still decline the transaction. Additionally, or alternatively, the processing system may require that all interactions be made using biometric credentials (e.g., an interaction made via the PIN will be declined). Alternatively, the processing system may store and apply conditions by which interactions with specific third party identifiers, third party types, and or interaction amounts exceeding a maximum amount are required to be made using biometric credentials (e.g., in which case the interaction would be declined if a PIN, rather than a biometric credential, is received).

Although FIG. 1C illustrates the processing system first determining the enabled/disabled status and then determining whether the user-specified conditions are satisfied, the processing system alternatively may first determine whether the user-specified conditions are satisfied and may then determine the enabled/disabled status.

As shown by reference number 180, the processing system may transmit a notification (e.g., an approve notification or a decline notification) to the terminal based on authenticating the interaction and/or determining that one or more conditions are satisfied. After receiving the interaction, the terminal may complete the interaction with the user using the physical medium.

The system described above offers multiple levels of security beyond just a PIN or fingerprint to authorize an interaction (e.g., transaction). For example, after matching scanned fingerprint data with stored fingerprint data in the physical medium (e.g., transaction card), a step or condition that results in authorization of a transaction in other fingerprint-based authorization systems, the system described above takes extra security measures. For example, the processing system determines whether authentication credentials (e.g., PIN and/or biometric credentials) transmitted from the physical medium match stored authentication credentials stored by the processing system and/or determines whether certain conditions (e.g., for multiple users) have been satisfied. As such, even if the physical medium was stolen and a fingerprint was lifted and used, an unauthorized user would not be able to have an interaction authorized.

As indicated above, FIGS. 1A-1C are provided as an example. Other examples may differ from what is described with regard to FIGS. 1A-1C.

Figure 2:
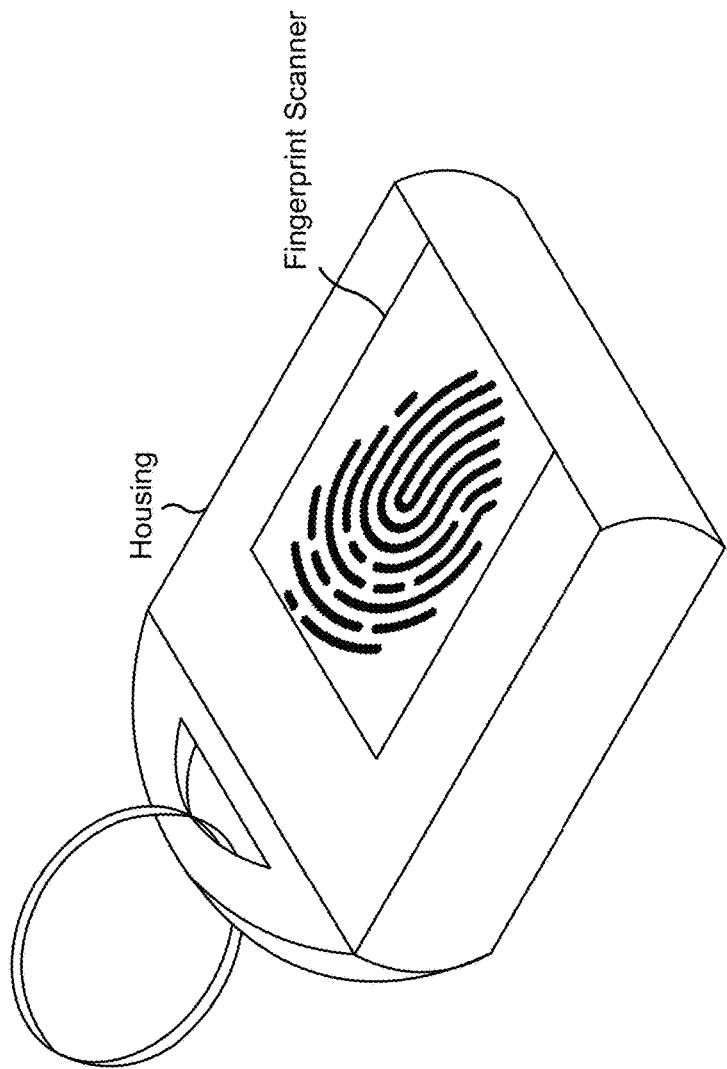
FIGS. 2 and 3 are diagrams of example implementations associated with a biometric authentication-based token, in accordance with some embodiments of the present disclosure.
Figure 3:
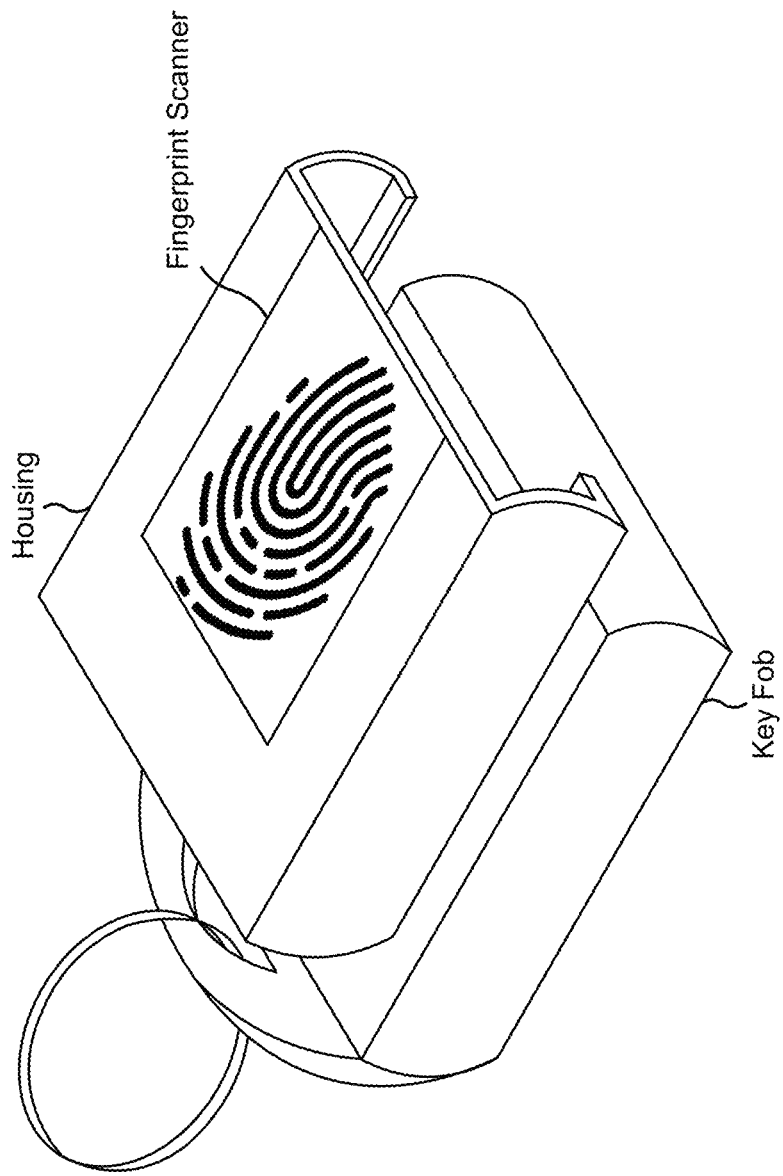

FIGS. 2 and 3 are diagrams of examples 200 and 300 associated with a biometric authentication-based token. As shown in FIGS. 2 and 3, examples 200 and 300 each includes a physical medium. The physical medium is described in more detail in connection with FIGS. 4 and 5.

As shown in FIGS. 2 and 3, the physical medium may include a housing (also referred to as a body) in which and/or on which the fingerprint scanner, the memory, and/or the processor may be housed. Additionally, or alternatively, the physical medium (e.g., the housing) may have a size (e.g., a footprint) that may be smaller than a traditional or standard interaction card (e.g., a transaction card). For example, as shown in FIG. 2, the physical medium may be in the form of a key fob. Alternatively, as shown in FIG. 3, the physical medium may be adapted to fit on and/or around and/or attach to (e.g., via a snap fit) a key fob, such as for a vehicle. In such implementations, the physical medium may be able to be used as or on a keychain. Additionally, by the nature of the size and configuration of the physical medium, the housing does not have a magnetic stripe. As a result, account information may not be improperly accessed (e.g., via skimming), thereby increasing the security over a traditional transaction card. To accommodate the smaller size, the fingerprint scanner, the memory, and the processor may be arranged in a stacked configuration within the housing. In implementations in which the physical medium includes an account selection element (e.g., a switch), the account selection element may be disposed in and/or on the housing. The account selection element may interact with the processor and/or the memory to determine the particular account and which account identifier to transmit. Additionally, the physical medium may have no account information (e.g., user's name, ID, account number, expiration information, and/or card verification value (CVV)) on any portion of the housing. Accordingly, the account information may not be improperly obtained from the physical medium (e.g., if read off the physical medium and/or if the physical medium was lost), thereby further increasing the security of the physical medium.

In some implementations, the physical medium may have some user identifier printed on or otherwise affixed on the housing. The user identifier may be a random mix of characters (e.g., alphanumeric characters and/or symbols) associated with the user (e.g., as stored in the account profile database) such that if the physical medium was lost and subsequently found, the user may be identified from the user identifier, and the physical medium may be returned to the user. Additionally, or alternatively, the housing may accommodate other personalization (e.g., prints, photos, or the like).

As indicated above, FIGS. 2 and 3 are provided as examples. Other examples may differ from what is described with regard to FIGS. 2 and 3.

Figure 4:
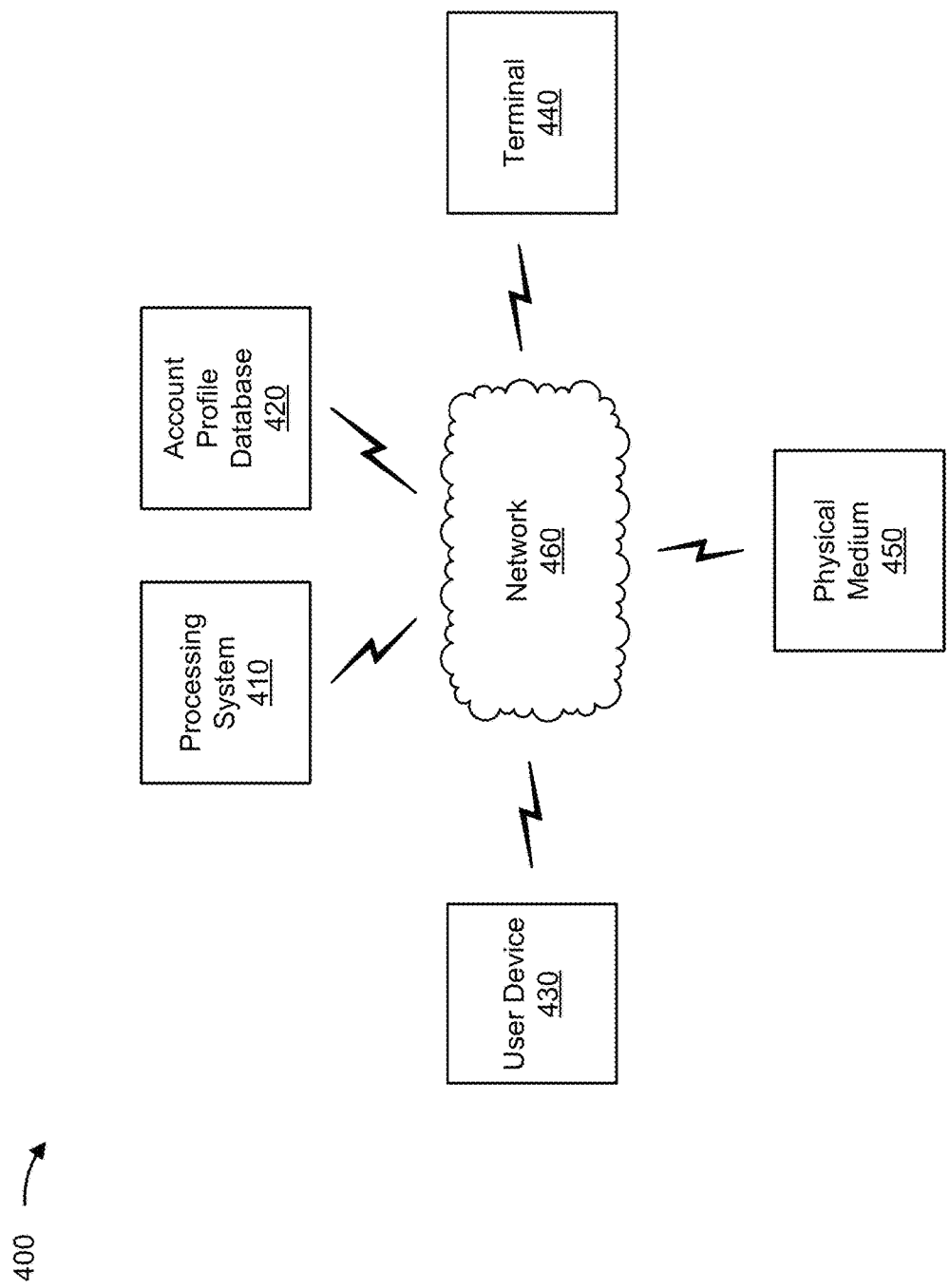
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a processing system 410, an account profile database 420, a user device 430, a terminal 440, a physical medium 450, and a network 460. Devices of environment 400 may interconnect via wired connections, wireless connections, or a combination of wired and wireless connections.

The processing system 410 may include one or more devices capable of receiving, generating, storing, processing, providing, and/or routing information associated with a biometric authentication-based token, as described elsewhere herein. The processing system 410 may include a communication device and/or a computing device. For example, the processing system 410 may include a server, such as an application server, a client server, a web server, a database server, a host server, a proxy server, a virtual server (e.g., executing on computing hardware), or a server in a cloud computing system. In some implementations, the processing system 410 includes computing hardware used in a cloud computing environment.

The account profile database 420 may include one or more devices capable of receiving, generating, storing, processing, and/or providing information associated with a biometric authentication-based token, as described elsewhere herein. The account profile database 420 may include a communication device and/or a computing device. For example, the account profile database 420 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the account profile database 420 may store account information, including an account identifier, a PIN, and one or more biometric credentials (e.g., fingerprint data and biometric tokens), as described elsewhere herein.

The user device 430 may include one or more devices capable of receiving, generating, storing, processing, and/or providing information associated with a biometric authentication-based token, as described elsewhere herein. The user device 430 may include a communication device and/or a computing device. For example, the user device 430 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The terminal 440 may include one or more devices capable of facilitating an electronic interaction (e.g., transaction). For example, the terminal 440 may include a PoS terminal, a payment terminal (e.g., a credit card terminal, a contactless payment terminal, a mobile credit card reader, or a chip reader), and/or an ATM. In some implementations, the terminal 440 may include an access control terminal (e.g., used to control physical access to a secure area), such as an access control panel used to control an access-controlled entry (e.g., a turnstile, a door, a gate, or another physical barrier). The terminal 440 may include one or more input components and/or one or more output components to facilitate obtaining data (e.g., account information) from an interaction device (e.g., a transaction card, a mobile device executing a payment application, or the like) and/or to facilitate interaction with and/or authorization from an owner or accountholder of the interaction device. Example input components of the terminal 440 include a number keypad, a touchscreen, a magnetic stripe reader, a chip reader, and/or an RF signal reader (e.g., an NFC reader). Example output devices of terminal 440 include a display and/or a speaker.

The physical medium 450 may be a device capable of being used for an electronic interaction. The physical medium 450 may include integrated circuitry capable of storing and communicating account information. For example, the physical medium 450 may be a key fob, an attachment to a key fob, and/or a film. The physical medium 450 may store account information associated with the physical medium 450, which may be used in connection with an electronic interaction. The account information may include, for example, an account identifier that identifies an account (e.g., a bank account or a credit account) associated with the physical medium 450 (e.g., an account number, a card number, a bank routing number, and/or a bank identifier), a cardholder identifier (e.g., identifying a name of a person, business, or entity associated with the account or the physical medium 450), expiration information (e.g., identifying an expiration month and/or an expiration year associated with the physical medium 450), and/or a credential (e.g., a payment token). In some implementations, the physical medium 450 may store the account information in tamper-resistant memory of the physical medium 450, such as in a secure element. As part of performing an electronic interaction, the physical medium 450 may transmit the account information to a terminal using a communication component, such a contactless communication component (e.g., an NFC component, an RF component, a Bluetooth component, and/or a Bluetooth Low Energy (BLE) component). Thus, the physical medium 450 and the terminal may communicate with one another via contactless communication (e.g., using NFC). As described above, the physical medium 450 may include a fingerprint scanner, memory, and one or more processors.

The network 460 may include one or more wired and/or wireless networks. For example, the network 460 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 460 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
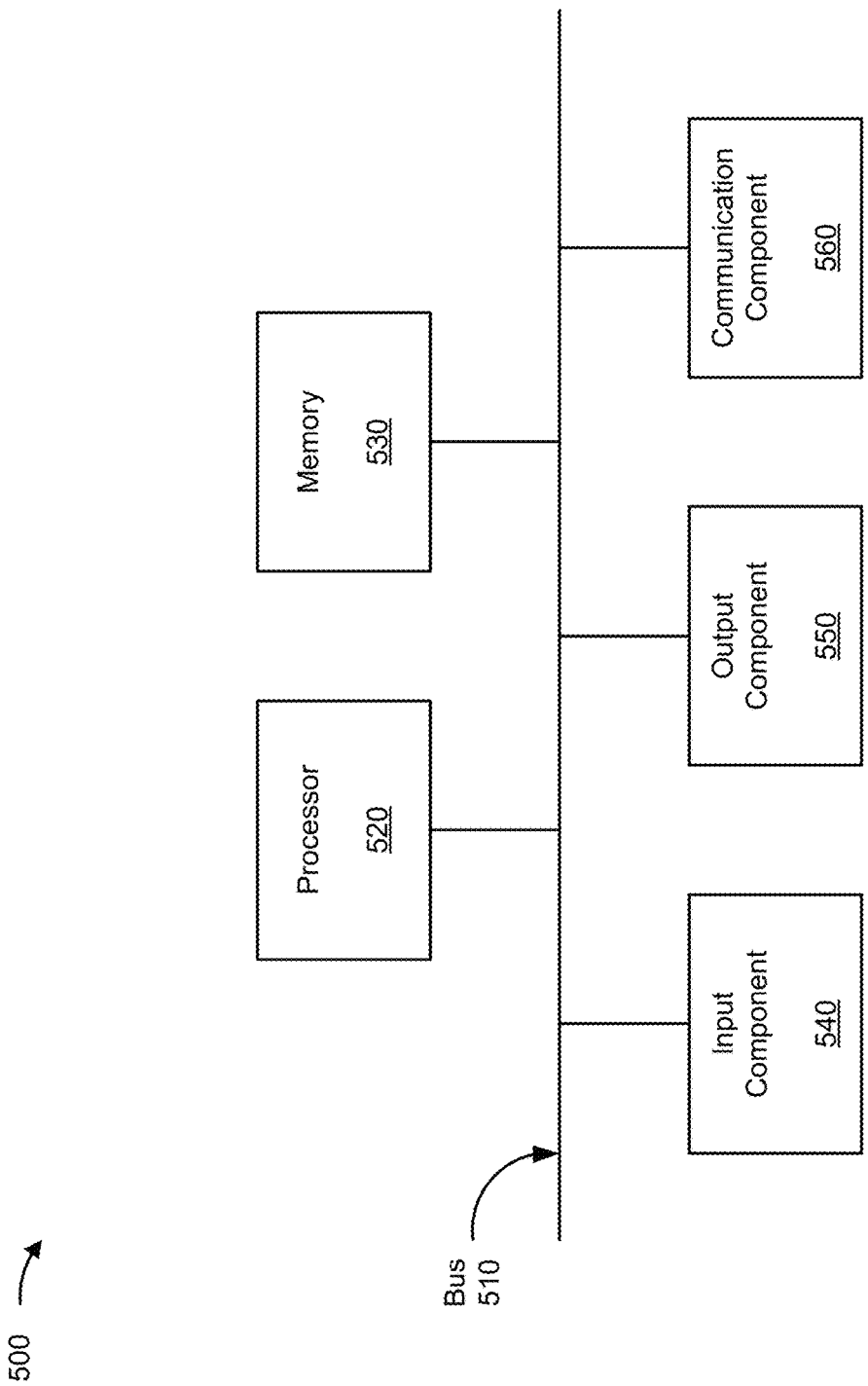
FIG. 5 is a diagram of example components of a device associated with a biometric authentication-based token, in accordance with some embodiments of the present disclosure.

FIG. 5 is a diagram of example components of a device 500 associated with a biometric authentication-based token. Device 500 may correspond to processing system 410, account profile database 420, user device 430, terminal 440, and/or physical medium 450. In some implementations, processing system 410, account profile database 420, user device 430, terminal 440, and/or physical medium 450 may include one or more devices 500 and/or one or more components of device 500. As shown in FIG. 5, device 500 may include a bus 510, a processor 520, a memory 530, an input component 540, an output component 550, and a communication component 560.

Bus 510 may include one or more components that enable wired and/or wireless communication among the components of device 500. Bus 510 may couple together two or more components of FIG. 5, such as via operative coupling, communicative coupling, electronic coupling, and/or electric coupling. Processor 520 may include a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 may include one or more processors capable of being programmed to perform one or more operations or processes described elsewhere herein.

Memory 530 may include volatile and/or nonvolatile memory. For example, memory 530 may include RAM, read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 may include one or more memories that are coupled to one or more processors (e.g., processor 520), such as via bus 510.

Input component 540 may enable device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
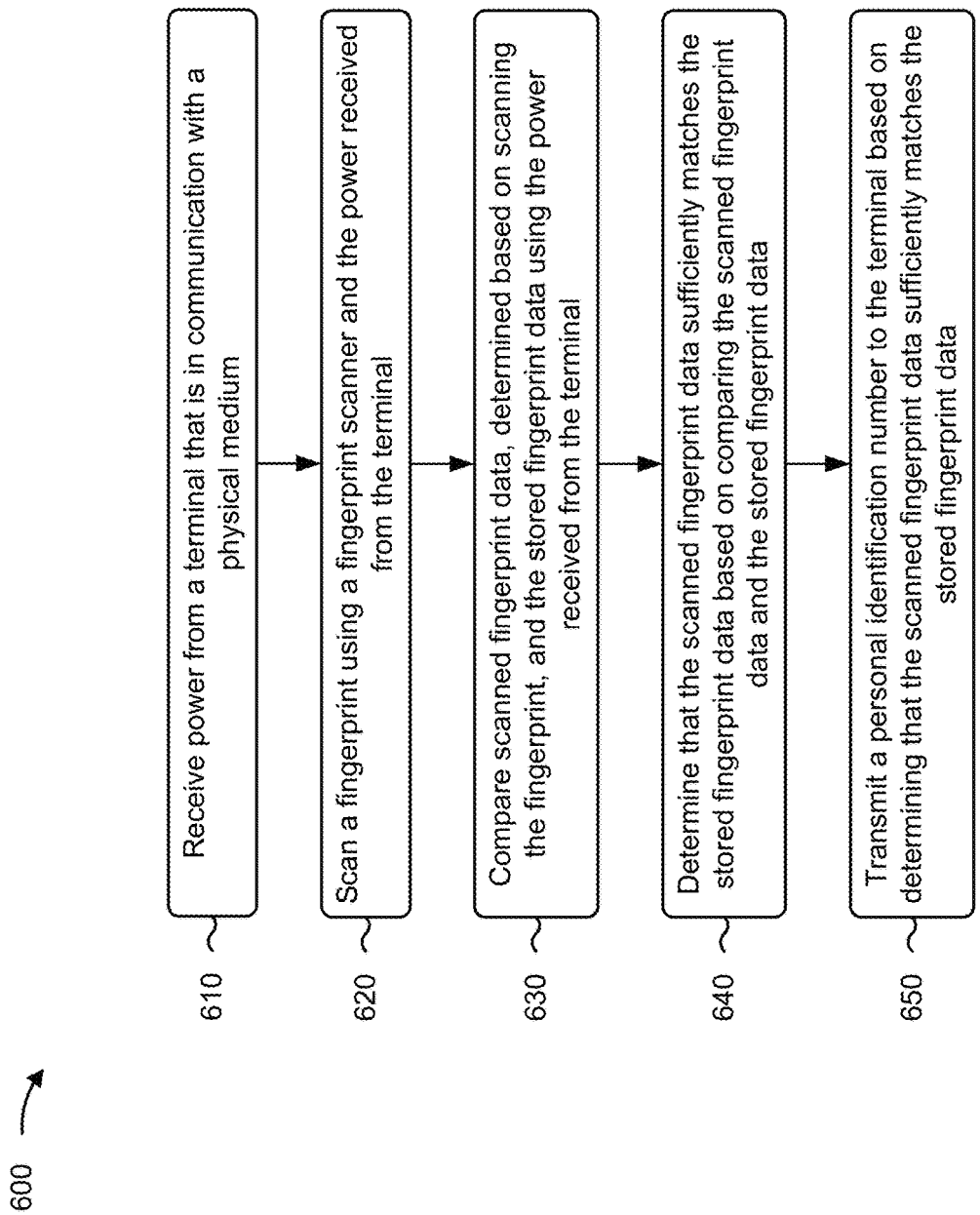
FIG. 6 is a flowchart of an example process associated with a biometric authentication-based token, in accordance with some embodiments of the present disclosure.

FIG. 6 is a flowchart of an example process 600 associated with a biometric authentication-based token. In some implementations, one or more process blocks of FIG. 6 may be performed by the physical medium 450. In some implementations, one or more process blocks of FIG. 6 may be performed by another device or a group of devices separate from or including the physical medium 450, such as the processing system 410. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving power from a terminal that is in communication with the physical medium (block 610). For example, the physical medium 450 (e.g., using processor 520, memory 530, input component 540, and/or communication component 560) may receive power from a terminal that is in communication with the physical medium, as described above in connection with reference number 140 of FIG. 1B. As an example, the terminal may provide power to the physical medium by way of the interaction between the physical medium and the terminal.

As further shown in FIG. 6, process 600 may include scanning a fingerprint using the fingerprint scanner and the power received from the terminal (block 620). For example, the physical medium 450 (e.g., using processor 520 and/or memory 530) may scan a fingerprint using the fingerprint scanner and the power received from the terminal, as described above in connection with reference number 145 of FIG. 1B. As an example, the fingerprint scanner may scan a fingerprint of the user. For example, the fingerprint scanner may detect a user interaction with the fingerprint scanner (e.g., the user's finger pressing on the fingerprint scanner one or more times) until the physical medium determines that the scan of the fingerprint is complete (e.g., the scan satisfies a threshold amount of unique identifier information, or minutiae points, captured from the scan).

As further shown in FIG. 6, process 600 may include comparing scanned fingerprint data and the stored fingerprint data using the power received from the terminal (block 630). For example, the physical medium 450 (e.g., using processor 520 and/or memory 530) may compare scanned fingerprint data, determined based on scanning the fingerprint, and the stored fingerprint data using the power received from the terminal, as described above in connection with reference number 150 of FIG. 1B. As an example, the physical medium, using the power received from the terminal, may compare the scanned fingerprint data and the stored fingerprint data (e.g., stored in the memory of the physical medium) and determine if there is a sufficient match between the scanned fingerprint data and the stored fingerprint data.

As further shown in FIG. 6, process 600 may include determining that the scanned fingerprint data sufficiently matches the stored fingerprint data based on comparing the scanned fingerprint data and the stored fingerprint data (block 640). For example, the physical medium 450 (e.g., using processor 520 and/or memory 530) may determine that the scanned fingerprint data sufficiently matches the stored fingerprint data based on comparing the scanned fingerprint data and the stored fingerprint data, as described above in connection with reference number 150 of FIG. 1B.

As further shown in FIG. 6, process 600 may include transmitting the PIN to the terminal based on determining that the scanned fingerprint data sufficiently matches the stored fingerprint data (block 650). For example, the physical medium 450 (e.g., using processor 520, memory 530, and/or communication component 560) may transmit the PIN to the terminal based on determining that the scanned fingerprint data sufficiently matches the stored fingerprint data, as described above in connection with reference number 155 of FIG. 1B. As an example, after the physical medium detects a sufficient match, the physical medium may transmit the account identifier (e.g., a PAN) and the authentication credential (e.g., the biometric credential and/or the PIN) to the terminal.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1C. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for a biometric authentication-based token, the system comprising:
    a physical medium that includes:
    a fingerprint scanner,
    a processor, and
    memory that stores fingerprint data, an account identifier, and an authentication credential for use with authenticating an interaction;
    wherein the physical medium is configured to:
    receive power from a terminal that is in communication with the physical medium for performing the interaction;
    scan a fingerprint using the fingerprint scanner;
    compare scanned fingerprint data, determined based on scanning the fingerprint, and the stored fingerprint data using the power received from the terminal;
    determine that the scanned fingerprint data sufficiently matches the stored fingerprint data based on comparing the scanned fingerprint data and the stored fingerprint data; and
    transmit, to the terminal, the authentication credential and the account identifier based on determining that the scanned fingerprint data sufficiently matches the stored fingerprint data; and
    a processing system that includes:
    one or more memories; and
    one or more processors, communicatively coupled to the one or more memories, configured to:
    receive the account identifier and the authentication credential from the terminal;
    verify that the authentication credential is valid for the account identifier;
    determine, based on a status of the physical medium indicating whether fingerprint authentication is enabled or disabled, whether the fingerprint authentication is enabled or disabled; and
    transmit an approve notification to the terminal based on verifying that the authentication credential is valid for the account identifier and based on determining whether the fingerprint authentication is enabled or disabled.

2. The system of claim 1, wherein the one or more processors of the processing system are further configured to:
    determine that fingerprint-based authentication is enabled in connection with the account identifier based on a setting associated with the account identifier, wherein the setting allows fingerprint-based authentication to be enabled or disabled in connection with the account identifier; and
    wherein the one or more processors of the processing system are configured to transmit the approve notification based on determining that fingerprint-based authentication is enabled in connection with the account identifier.

3. The system of claim 1, wherein the fingerprint scanner, the processor, and the memory are arranged in a stacked configuration.

4. The system of claim 1, wherein the one or more processors of the processing system are further configured to:

identify a user associated with the authentication credential based on an account profile associated with the account identifier, wherein the account profile stores a plurality of authentication credentials corresponding to a plurality of users associated with the account identifier; and transmit or store information indicating that the interaction is associated with the user.

5. The system of claim 1, wherein the physical medium includes a body in or on which the fingerprint scanner, the processor, and the memory are housed, and wherein the body is configured to attach to a key fob.

6. The system of claim 1, wherein the authentication credential is a biometric credential that includes at least one of:

the stored fingerprint data; or a biometric token generated based on the stored fingerprint data.

7. The system of claim 1, wherein the authentication credential is a personal identification number (PIN).

8. A physical medium for a biometric authentication-based token, the physical medium comprising:

a fingerprint scanner;

one or more memories that store fingerprint data and a personal identification number (PIN);

one or more processors, communicatively coupled to the one or more memories, configured to:

receive power from a terminal that is in communication with the physical medium;

scan a fingerprint using the fingerprint scanner and the power received from the terminal;

compare scanned fingerprint data, determined based on scanning the fingerprint, and the stored fingerprint data using the power received from the terminal;

determine that the scanned fingerprint data sufficiently matches the stored fingerprint data based on comparing the scanned fingerprint data and the stored fingerprint data; and transmit the PIN to the terminal based on determining that the scanned fingerprint data sufficiently matches the stored fingerprint data, wherein a transaction associated with the terminal is approved based on determining whether fingerprint authentication is enabled or disabled, wherein the determination is based on a status of the physical medium indicating whether the fingerprint authentication is enabled or disabled; and a housing in which the fingerprint scanner, the one or more memories, and the one or more processors are housed.

9. The physical medium of claim 8, wherein the one or more processors are further configured to transmit an account identifier, associated with the physical medium, to the terminal based on determining that the scanned fingerprint data sufficiently matches the stored fingerprint data, wherein the account identifier in combination with the PIN enables authorization of an interaction that involves the physical medium and the terminal.

10. The physical medium of claim 9, further comprising:

a switch on the housing, the switch having a position that is switchable between a first position and a second position, wherein the first position corresponds to a first account, and the second position corresponds to a second account, and wherein the account identifier is based on the position of the switch in one of the first position or the second position.

11. The physical medium of claim 8, wherein the one or more processors are further configured to:

detect a user interaction with the fingerprint scanner in connection with an activation procedure that activates fingerprint-based PIN entry for the physical medium; and store the fingerprint data in the one or more memories based on detecting the user interaction with the fingerprint scanner in connection with the activation procedure.

12. The physical medium of claim 8, wherein the one or more processors are further configured to:

receive the fingerprint data from a device that is different from the physical medium; and store the fingerprint data in the one or more memories based on receiving the fingerprint data from the device.

13. The physical medium of claim 8, wherein the one or more processors are further configured to:

receive the PIN in connection with an activation procedure that activates fingerprint-based PIN entry for the physical medium; and store the PIN in the one or more memories based on receiving the PIN.

14. The physical medium of claim 8, wherein the one or more processors are further configured to:

receive, from a user device associated with the physical medium, an instruction to enable or disable fingerprint-based authentication for the physical medium; and store, in the one or more memories, an indication of whether fingerprint-based authentication is enabled or disabled for the physical medium based on the instruction; and wherein the one or more processors, to transmit the PIN to the terminal, are configured to transmit the PIN to the terminal based on the indication of whether fingerprint-based authentication is enabled or disabled for the physical medium.

15. The physical medium of claim 8, wherein the fingerprint scanner, the one or more processors, and the one or more memories are arranged in a stacked configuration.

16. The physical medium of claim 8, further comprising:

a radio frequency antenna that communicates with the terminal via near-field communication or radio frequency identification to enable the physical medium to receive the power via electromagnetic induction.

17. A method of authentication, comprising:

receiving, by a key fob having one or more processors, power from a terminal that is in communication with the key fob for performing an interaction;

scanning, by a fingerprint scanner of the key fob, a fingerprint associated with a user;

comparing, by the one or more processors of the key fob, scanned fingerprint data, determined based on scanning the fingerprint, and stored fingerprint data, stored on one or more memories of the key fob, using the power received from the terminal;

determining, by the one or more processors of the key fob, that the scanned fingerprint data sufficiently matches the stored fingerprint data based on comparing the scanned fingerprint data and the stored fingerprint data; and transmitting, by the key fob and to the terminal, an authentication credential and an account identifier associated with a user account of the user based on determining that the scanned fingerprint data sufficiently matches the stored fingerprint data, wherein a transaction associated with the terminal is approved based on determining whether fingerprint authentication is enabled or disabled, wherein the determination is based on a status of the key fob indicating whether the fingerprint authentication is enabled or disabled.

18. The method of claim 17, further comprising:

transmitting, to the terminal, user data indicating one or more characteristics of the user in connection with the interaction.

19. The method of claim 17, wherein the authentication credential is a biometric credential that includes at least one of:

the stored fingerprint data; or a biometric token generated based on the stored fingerprint data.

20. The method of claim 17, wherein the authentication credential is a personal identification number (PIN).

* * * * *